(12) United States Patent
Vairavakkalai

(10) Patent No.: US 11,405,308 B2
(45) Date of Patent: Aug. 2, 2022

(54) AUTOMATIC DISCOVERY OF ROUTE REFLECTION PEERING END-POINTS

(71) Applicant: Juniper Networks, Inc., Sunnyvale, CA (US)

(72) Inventor: Kaliraj Vairavakkalai, Mountain House, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 267 days.

(21) Appl. No.: 16/704,670

(22) Filed: Dec. 5, 2019

(65) Prior Publication Data
US 2021/0176165 A1 Jun. 10, 2021

(51) Int. Cl.
*H04L 45/00* (2022.01)
*G06F 16/23* (2019.01)
*H04L 12/66* (2006.01)

(52) U.S. Cl.
CPC .......... *H04L 45/26* (2013.01); *G06F 16/2379* (2019.01); *H04L 12/66* (2013.01)

(58) Field of Classification Search
CPC ......... H04L 45/26; H04L 12/66; H04L 45/04; H04L 45/02; H04L 45/74; G06F 16/2379
See application file for complete search history.

(56) References Cited

U.S. PATENT DOCUMENTS

| | | | |
|---|---|---|---|
| 7,675,912 B1 * | 3/2010 | Ward | H04L 45/026 370/392 |
| 7,702,765 B1 * | 4/2010 | Raszuk | H04L 45/02 709/223 |
| 7,751,405 B1 | 7/2010 | Kompella et al. | |
| 8,117,338 B2 | 2/2012 | Ould-Brahim | |
| 10,015,073 B2 | 7/2018 | Patel et al. | |
| 10,142,223 B2 | 11/2018 | Bickhart | |

(Continued)

FOREIGN PATENT DOCUMENTS

| | | |
|---|---|---|
| CN | 103259716 A | 8/2013 |
| CN | 107409092 A | 11/2017 |

(Continued)

OTHER PUBLICATIONS

"Route Reflection topology planning in service provider networks"; Solla et al.; 2017 IEEE URUCON; Oct. 23, 2017 (Year: 2017).*

(Continued)

*Primary Examiner* — Benjamin H Elliott, IV
(74) *Attorney, Agent, or Firm* — Harrity & Harrity, LLP

(57) ABSTRACT

An auto-discovery route reflector (auto-discovery-RR) may obtain a route from an originating network device and may update a data structure to include at least some information contained in the route. The auto-discovery-RR may identify, based on the data structure, a plurality of target network devices, wherein the plurality of target network devices includes at least one route reflector (RR) and at least one route reflector client (RR-client). The auto-discovery-RR may send the route to the plurality of target network devices to facilitate establishment of a connection between the originating network device and at least one target network device of the plurality of target network devices.

20 Claims, 13 Drawing Sheets

(56) References Cited

U.S. PATENT DOCUMENTS

| | | | |
|---|---|---|---|
| 2007/0097974 A1* | 5/2007 | Ward | H04L 45/46 |
| | | | 370/392 |
| 2016/0248663 A1* | 8/2016 | Patel | H04L 45/12 |
| 2019/0081925 A1* | 3/2019 | Gottlieb | H04L 61/6022 |
| 2021/0176165 A1* | 6/2021 | Vairavakkalai | H04L 12/66 |

FOREIGN PATENT DOCUMENTS

| | | |
|---|---|---|
| CN | 107409093 A | 11/2017 |
| CN | 107872389 A | 4/2018 |

OTHER PUBLICATIONS

Extended European Search Report for Application No. EP20120565.6, dated May 12, 2021, 9 pages.

\* cited by examiner

Example RR Advertisement Route

```
RR-advertisement-route Prefix:
   +--------------------+
   | Route-Distinguisher|
   +--------------------+
   | Type  | Version    |
   +--------------------+
   | AFI   | SAFI       |
   +--------------------+

Route-Distinguisher: Unique RD to distinguish advertisement for AFI,SAFI from different nodes
Type = 1, RR-advertisement, Version=0 for forward-compatibility
AFI, SAFI = address family
IPver = 4 or 6, type of local-IP-address
Attributes:
             Nexthop or Multinexthop attribute: RR's local-IPv4/v6-address
             origin-AS extended-community carrying local-AS
             Local-pref (function of "NumPeers, NumPrefixes, NumRoutes")
             optional: rt-import:unique-router-id:x
             RTs: target:ClassRR:0
```

FIG. 2A

Example RR-Client Request Route

```
Client-advertisement-route, Prefix:
+-----------------------------------+
|       Route-Distinguisher         |
+-----------------+-----------------+
|      Type       |     Version     |
+-----------------+-----------------+
|       AFI       |      SAFI       |
+-----------------+-----------------+

Route-Distinguisher: Unique RD to distinguish advertisement for AFI,SAFI from different nodes
Type = 2, Client-advertisement, Version=0 for forward-compatibility
AFI, SAFI = address family
Attributes:
            Nexthop or Multinexthop-attribute: Client's local-IPv4/v6-address
            origin-AS extended-community: carrying local-AS
            Config attr specifying Num-RR-sessions-requested
            optional: rt-import:unique-router-id:x
            RTs: target:ClassRRC:0
```

FIG. 2B

Example RR Neighborship Advertisement Route

```
Neighborship-advertisement-route, Prefix:
  +--------------------+
  | Route-Distinguisher|
  +--------------------+
  | Type  | Version    |
  +--------------------+
  | ver   | Client-Address
  +--------------------+
  | AFI   | SAFI
  +--------------------+

Route-Distinguisher: Unique RD to distinguish advertisement for Client, AFI, SAFI from different RR-nodes
Type = 3, Neighborship-advertisement, Version=0 (for forward-compatibility)
ver: v4 or v6
Client-Address: RR-Client's session-endpoint ip-address
AFI, SAFI = address family
Attributes:
  Nexthop or Multinexthop-attribute: Local-IPv4/v6-address of RR serving this Client
  MED: indicating IGP-cost from advertising RR-node to Client-Address
  optional: rt-import:unique-router-idxx
  RTs: target:ClassAS:0,
       target:client-router-id:0 (optional)
```

FIG. 2C

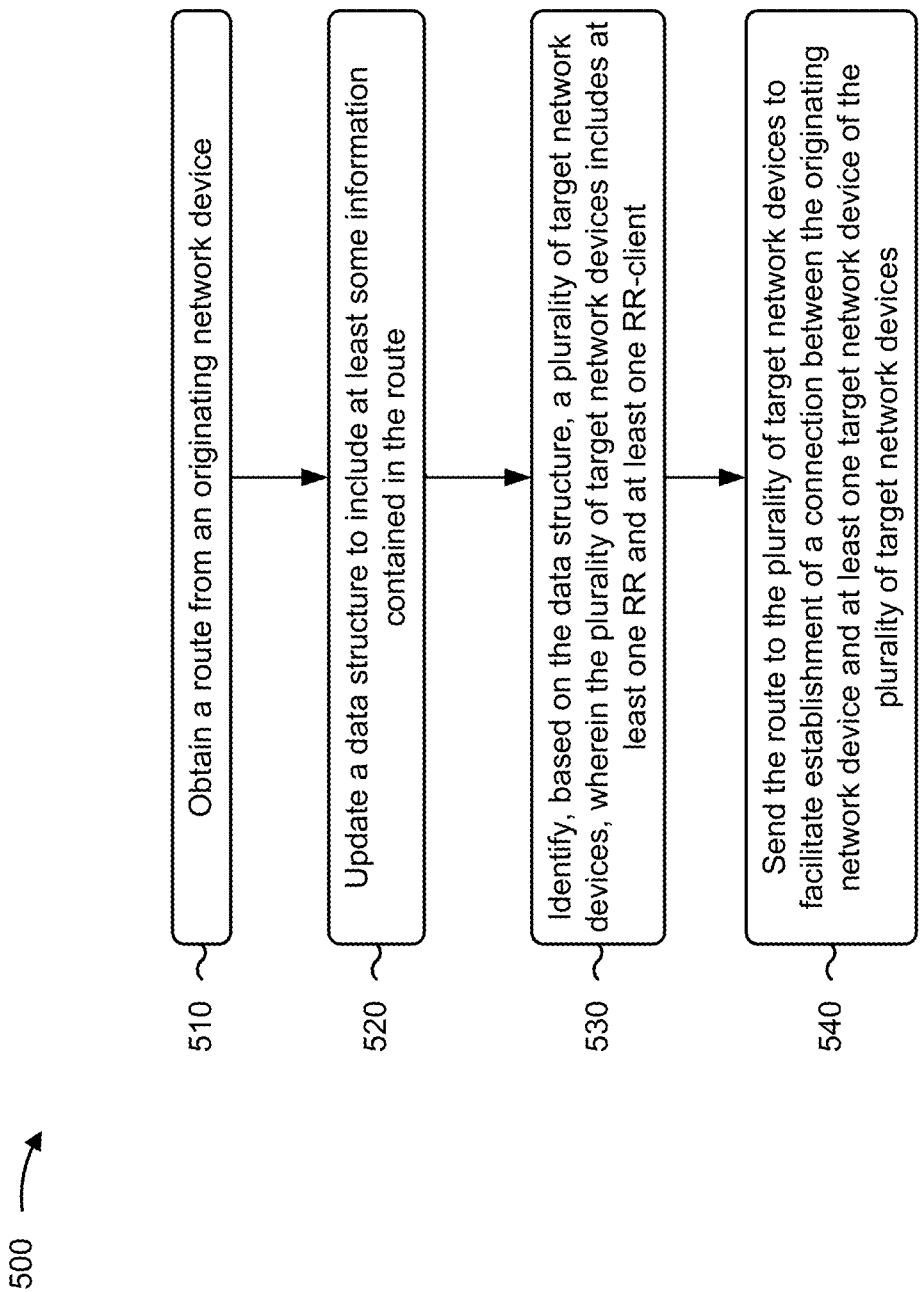

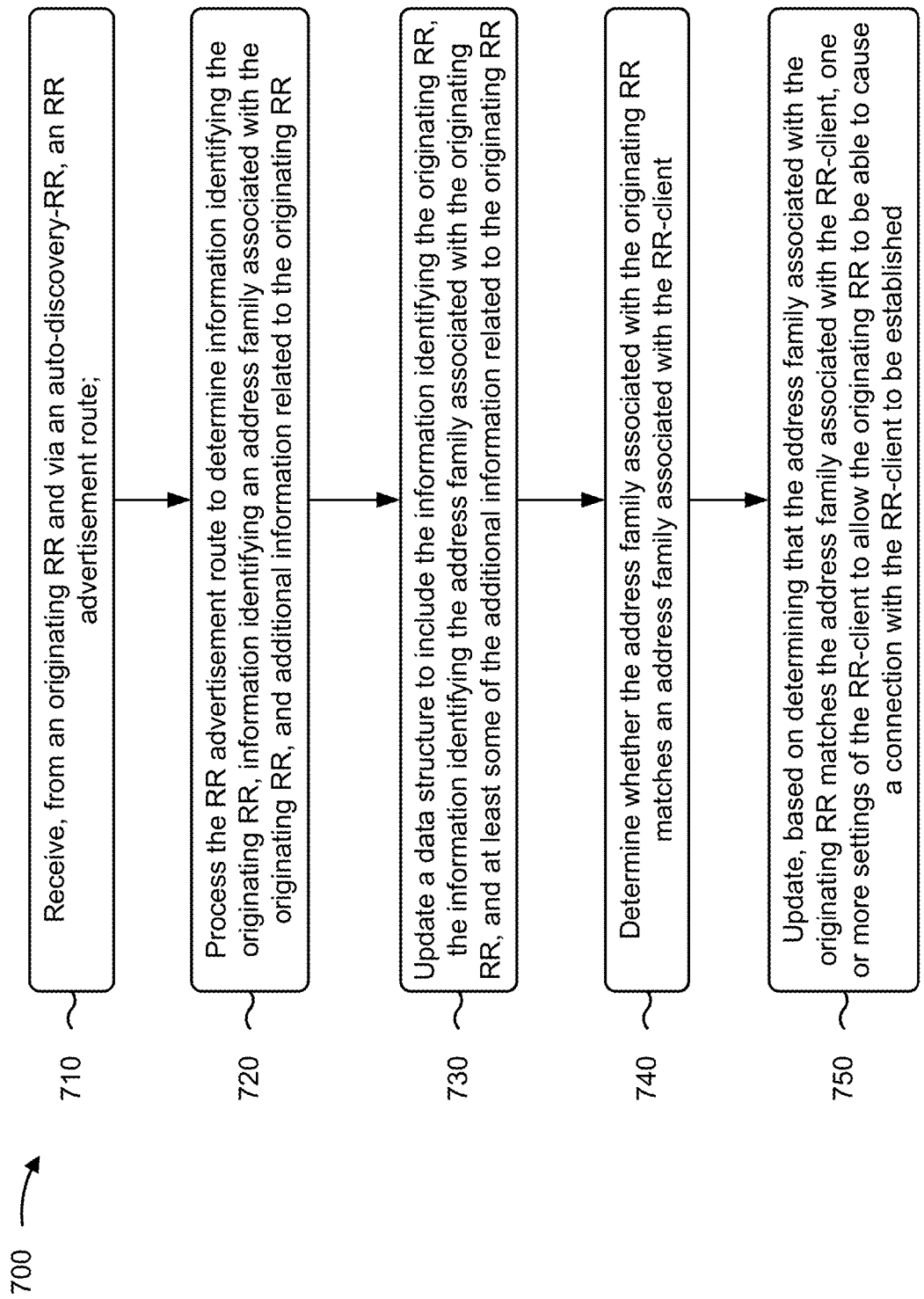

AUTOMATIC DISCOVERY OF ROUTE REFLECTION PEERING END-POINTS

BACKGROUND

A network that conforms to the border gateway protocol (BGP) may utilize route reflection, which allows a network device to send traffic to one or more network devices (e.g., BGP peers) without having to individually send the traffic to each network device of the one or more network devices.

SUMMARY

According to some implementations, a method may include obtaining, by an automatic discovery route reflector (auto-discovery-RR), a route from an originating network device; updating, by the auto-discovery-RR, a data structure to include at least some information contained in the route; identifying, by the auto-discovery-RR and based on the data structure, a plurality of target network devices, wherein the plurality of target network devices includes at least one route reflector (RR) and at least one route reflector client (RR-client); and sending, by the auto-discovery-RR, the route to the plurality of target network devices to facilitate establishment of a connection between the originating network device and at least one target network device of the plurality of target network devices.

According to some implementations, a route reflector (RR) may include one or more memories, and one or more processors to: receive, from an originating network device and via an automatic discovery route reflector (auto-discovery-RR), a route; process the route to determine information identifying the originating network device and additional information related to the originating network device; update a data structure to include the information identifying the originating network device and at least some of the additional information related to the originating network device; and cause, based on the information identifying the originating network device, a connection between the RR and the originating network device to be established.

According to some implementations, a non-transitory computer-readable medium may store one or more instructions. The one or more instructions, when executed by one or more processors of a route reflector client (RR-client), may cause the one or more processors to: receive, from an originating route reflector (RR) and via an automatic discovery route reflector (auto-discovery-RR), a route reflector advertisement route; process the RR advertisement route to determine information identifying the originating RR, information identifying an address family associated with the originating RR, and additional information related to the originating RR; update a data structure to include the information identifying the originating RR, the information identifying the address family associated with the originating RR, and at least some of the additional information related to the originating RR; determine whether the address family associated with the originating RR matches an address family associated with the RR-client; and update, based on determining that the address family associated with the originating RR matches the address family associated with the RR-client, one or more settings of the RR-client to allow the originating RR to be able to cause a connection with the RR-client to be established.

BRIEF DESCRIPTION OF THE DRAWINGS

FIG. 2A-2C are diagrams depicting example routes described herein.

FIGS. 5-7 are flowcharts of example processes for automatic discovery of route reflection peering end-points.

DETAILED DESCRIPTION

Figure 1A:
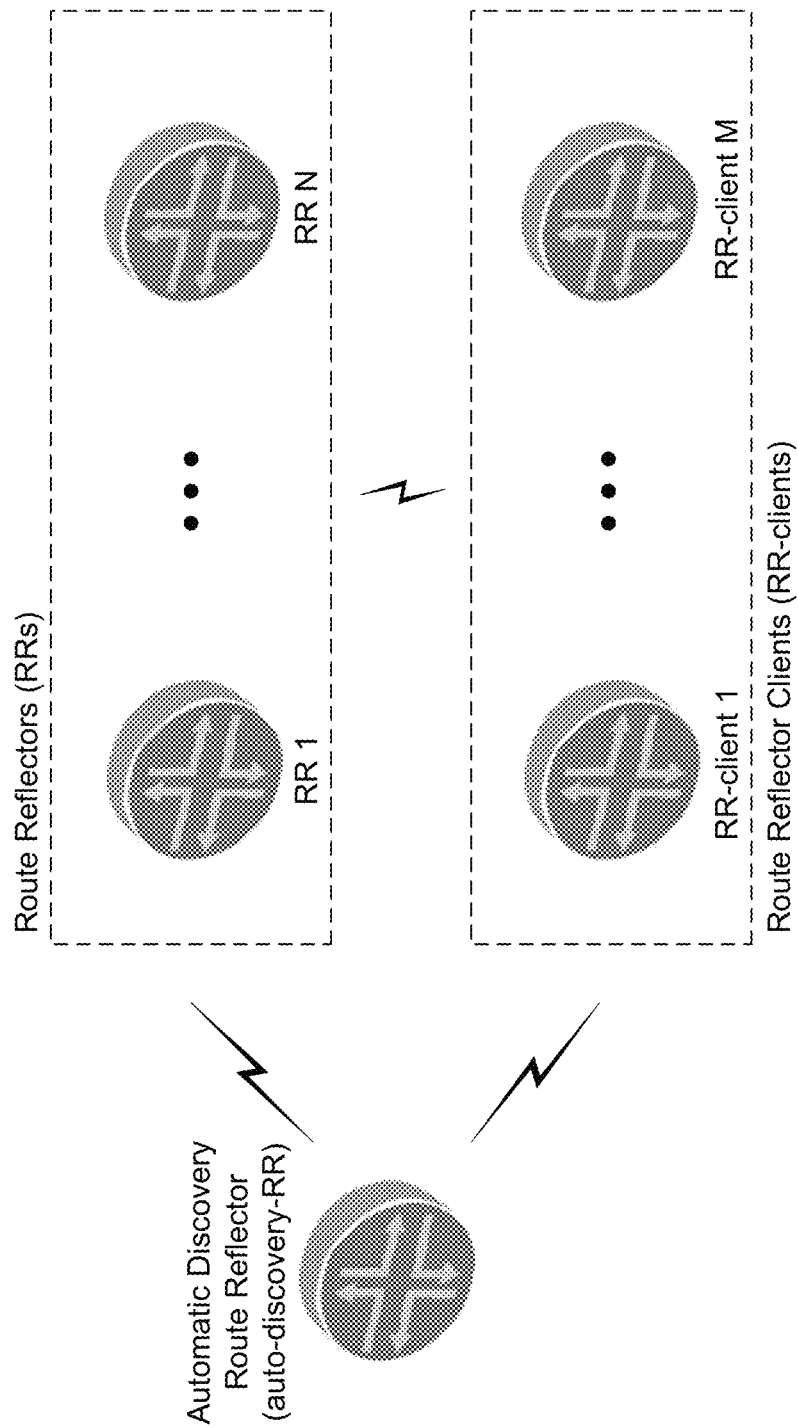
FIGS. 1A-1D are diagrams of one or more example implementations described herein.

The following detailed description of example implementations refers to the accompanying drawings. The same reference numbers in different drawings may identify the same or similar elements.

Route reflection in a BGP-enabled network allows one or more network devices of the network to communicate with each other without the one or more network devices being individually connected with each other (e.g., fully meshed). For example, a route reflection cluster may include one or more route reflectors (RRs) that serve one or more RR-clients. The one or more RRs may be fully meshed with each other, and each RR may be individually connected with each of the one or more RR-clients. Accordingly, in some cases, a network device external to the cluster may connect to at least one RR of the one or more RRs to send traffic to the one or more RR-clients via the at least one RR. In this way, the external network device does not need to be individually connected with the one or more RR-clients to send traffic to the one or more RR-clients, which may reduce an overall number of connections needed to serve network devices of the network. However, designing and implementing a network that utilizes route reflection requires manual configuration to ensure proper operation of each network device. This can be a resource intensive, time-consuming procedure that is susceptible to human error. Further, in many cases, because of the configuration complexities involved with route reflection, existing network devices cannot be easily changed and/or removed from the network and new network devices cannot be easily added to the network.

Some implementations described herein provide an automatic discovery route reflector (auto-discovery-RR) (e.g., also referred to as a bootstrap RR) that connects to every network device of a network. In some implementations, the auto-discovery-RR may reflect auto-discovery signaling routes (e.g., also referred to as bootstrap signaling routes) between network devices of the network. For example, in some implementations, a particular RR may send (e.g., when the particular RR is added or updated) an RR advertisement route to the auto-discovery-RR, which may send the RR advertisement route (e.g., reflect the RR advertisement route) to one or more RRs and/or one or more RR-clients of the network. In some implementations, the one or more RRs may connect with the particular RR and/or the one or more RR-clients may respectively update one or more settings to allow the particular RR to cause a connection to be established with the one or more RR-clients. In another example, in some implementations, a particular RR-client may send an RR-client request route to the auto-discovery-RR, which may send the RR-client request route (e.g., reflect the RR-client request route) to one or more RRs of the network. In some implementations, at least some of the one or more RRs may respectively cause a connection to be established with the particular RR-client. In some implementations, an RR, of the one or more RRs, may send an RR neighborship advertisement route to the other RRs to indicate that an active connection has been established between the RR and the particular RR-client.

In this way, the auto-discovery-RR may facilitate automatic configuration of route reflection in a network. Because of the auto-discovery signaling routes, the auto-discovery-RR may facilitate proper route reflection configuration of RRs and/or RR-clients as the RRs and/or RR-clients are updated and/or removed from the network and/or new RRs and/or new RR-clients are added to the network. RRs and RR-clients therefore do not need to be manually configured every time an RR or RR-client is updated, removed from the network, and/or added to the network. Accordingly, the auto-discovery-RR can reduce an amount of time to configure or reconfigure network devices of the network, thereby improving performance of the network relative to using a manual configuration process to configure the network devices. Further, the auto-discovery-RR can facilitate the network automatically adapting to dynamic changes to the network devices of the network to maintain proper route reflection configuration, which is not possible using a manual configuration process.

FIGS. 1A-1D are diagrams of one or more example implementations 100 described herein. As shown in FIG. 1A, example implementation(s) 100 may include multiple network devices, such as an auto-discovery-RR, one or more RRs (e.g., shown in FIG. 1A as RR 1 through RR N, where N is greater than or equal to 1), one or more RR-clients (e.g., shown in FIG. 1A as RR-client 1 through RR-client M, where M is greater than or equal to 1). The multiple network devices may be included in a network, such as a network that utilizes BGP route reflection. An RR or an RR-client may be configured with only the address of the auto-discovery-RR when added to the network to facilitate automatic discovery of route reflection peering end-points, as described herein.

Each RR may be connected with each of the other RRs of the one or more RRs (e.g. the one or more RRs may be fully meshed as BGP peers). Further, a set of RRs, of the one or more RRs, and a set of RR-clients, of the one or more RR-clients, may form a cluster (e.g., an RR cluster). The cluster may be associated with a particular addressing family. Each RR of the cluster may be respectively connected to each RR-client of the cluster (e.g., as BGP peers). One or more clusters may be formed from the one or more RRs and the one or more RR-clients.

The auto-discovery-RR may be respectively connected to each RR of the one or more RRs and/or may be respectively connected to each RR-client of the one or more RR-clients. For example, with reference to FIG. 1A, the auto-discovery-RR may be respectively connected with each of RR 1 through RR N and/or may be respectively connected with each of RR-client 1 through RR-client M (e.g., the auto-discovery RR has all the RRs and all of the RR-clients as configured-BGP-neighbors). The auto-discovery-RR may include and/or maintain a data structure that includes information identifying each RR of the one or more RRs and/or each RR-client of the one or more RR-clients; routing information associated with each RR of the one or more RRs and/or each RR-client of the one or more RR-clients; and/or the like. Accordingly, as described herein, the auto-discovery-RR may facilitate automatic configuration of route reflection for the network.

Figure 1B:
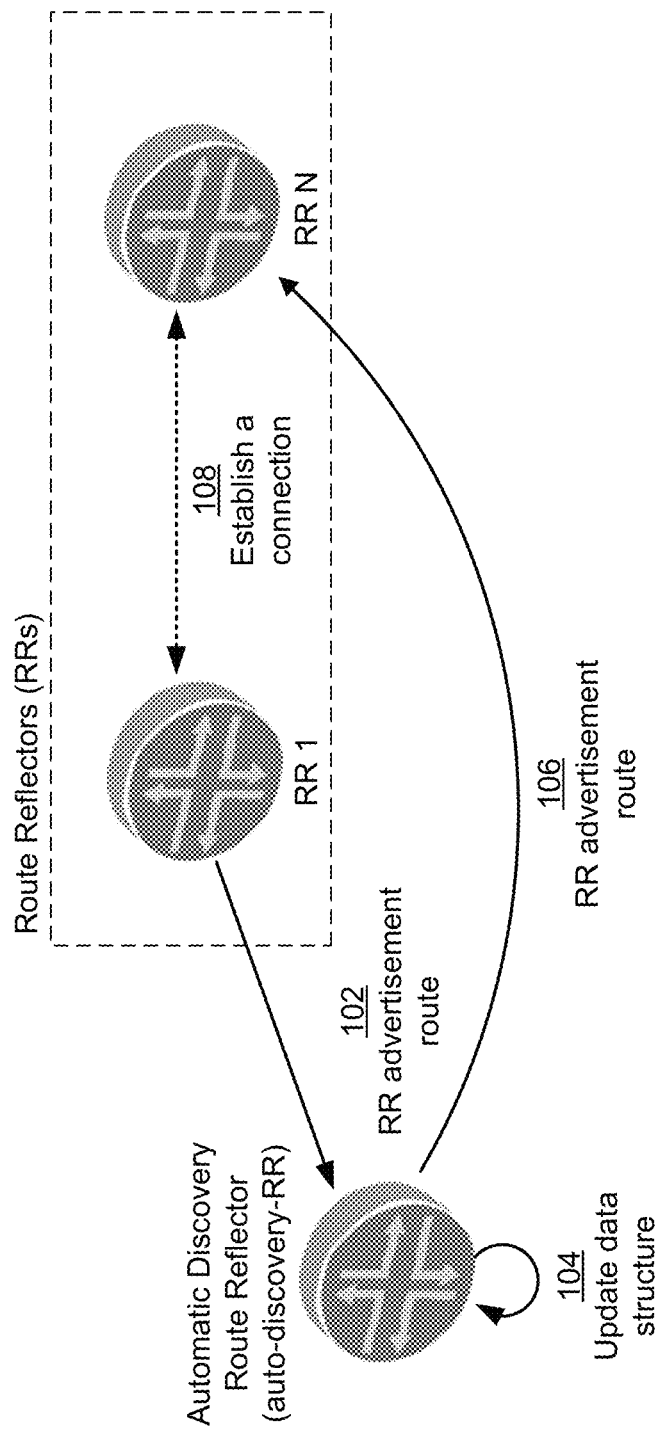

In some implementations, an RR, of the one or more RRs, may generate and/or send an auto-discovery signaling route, such as an RR advertisement route to the auto-discovery-RR. For example, as shown in FIG. 1B and by reference number 102, an originating RR (e.g., RR 1) may generate and/or send an RR advertisement route to the auto-discovery-RR. The originating RR may generate and/or send the RR advertisement route to the auto-discovery-RR when the originating RR is added to the network, when the originating RR is updated (e.g., an address associated with the originating RR changes, an address family supported by the originating RR changes, and/or the like), and/or the like. The RR advertisement route may include information identifying a route distinguisher of the route (e.g., a unique identifier); information identifying a type of the route (e.g., information indicating that the route is an RR advertisement route); information identifying at least one address family associated with the originating RR (e.g., an address family indicator (AFI) indicating a support for IPv4 and/or IPv6; a subsequent address family indicator (SAFI) indicating support for unicast, multicast, virtual private network (VPN), and/or the like; and/or the like); information identifying the originating RR (e.g., an internet protocol (IP) address associated with the originating RR, a physical location of the originating RR, and/or the like); information identifying a network associated with the originating RR (e.g., an autonomous system (AS) associated with the originating RR); information identifying at least one configuration preference of the originating RR (e.g., a maximum number of connections supported by the originating RR); information identifying at least one route target associated with the originating RR (e.g., a route target indicating that the originating RR belongs to a particular group, such as a group comprising the one or more RRs); and/or the like.

As shown by reference number 104, the auto-discovery-RR, upon receiving the RR advertisement route, may update the data structure included in the auto-discovery-RR to include at least some information contained in the RR advertisement route. For example, the auto-discovery-RR may update the data structure to include the information identifying the originating RR, the information identifying the network associated with the originating RR, the information identifying the at least one configuration preference of the originating RR, the information identifying the at least one route target associated with the originating RR, and/or the like. As shown by reference number 106, the auto-discovery-RR may search the data structure to identify the one or more RRs and may send the RR advertisement route to at least one RR (e.g., at least one target RR) of the one or more RRs (e.g., the auto-discovery-RR may send the RR advertisement route to the RR N as shown in FIG. 1B). In some implementations, the auto-discovery-RR may send the RR advertisement to each of the one or more RRs (e.g., RR 1 through RR N), to each of the one or more RRs excluding the originating RR (e.g., RR 2 through RR N), and/or the like.

A target RR that receives the RR advertisement route may process the RR advertisement route to determine the information identifying the originating RR and/or additional information related to the originating RR (e.g., the information identifying the at least one address family associated with the originating RR; the information identifying the network associated with the originating RR; the information identifying the at least one configuration preference of the originating RR; the information identifying at least one route target associated with the originating RR; and/or the like). The target RR may update a data structure (e.g., included in the target RR) to include the information identifying the originating RR and/or at least some of the additional information related to the originating RR.

In some implementations, the target RR may cause a connection (e.g., a BGP session) to be established between the originating RR and the target RR. For example, the target RR may determine, based on the information identifying the originating RR, an address of the originating RR, and may generate and/or send a connection initiation request to the originating RR to cause a connection to be established between the RR and the originating RR. As shown by reference number 108, the RR N may cause a connection between the RR 1 and the RR N to be established (e.g., based on the RR advertisement route).

In some implementations, after causing the connection between the originating RR and the target RR to be established, the target RR may send, to the originating RR, information identifying the target RR, information identifying at least one address family associated with the target RR, and/or the like. The originating RR may update a data structure (e.g., included in the originating RR) to include the information identifying the target RR, the information identifying at least one address family associated with the target RR, and/or the like. Additionally, or alternatively, the target RR may update one or more settings of the target RR (e.g., the target RR may enable advertisement of multiple paths for the same addressing prefix to ensure that all routes concerning other RRs are stored in the data structure of the target RR).

Figure 1C:
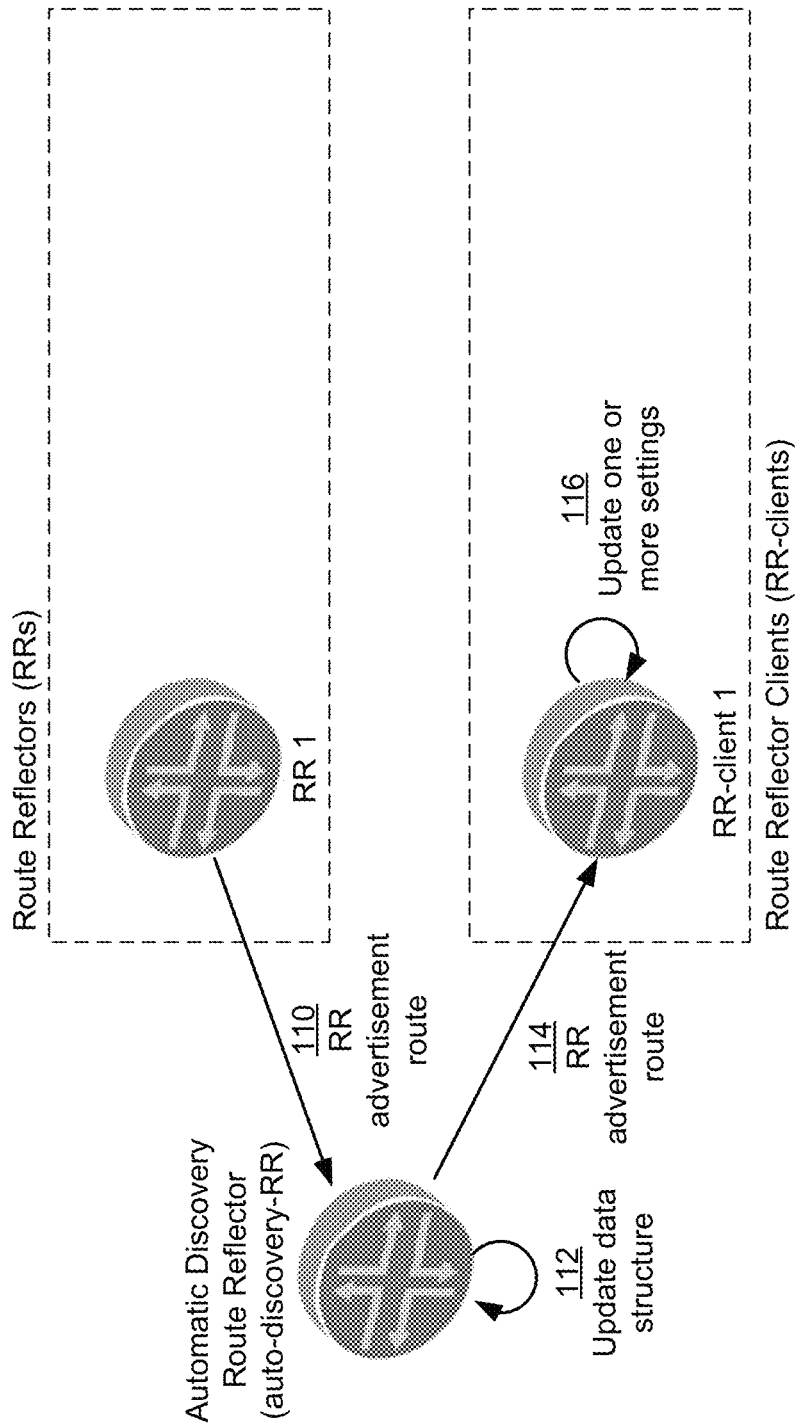

In some implementations, the originating RR may generate and/or send the RR advertisement route to the auto-discovery-RR, and the auto-discovery-RR may send the RR advertisement route to at least one RR-client of the one or more RR-clients. For example, as shown in FIG. 1C and by reference number 110, the originating RR (e.g., RR 1) may generate and/or send an RR advertisement route to the auto-discovery-RR (e.g., in a similar manner as described herein in relation to FIG. 1B and reference number 102). As shown by reference number 112, the auto-discovery-RR may update the data structure included in the auto-discovery-RR (e.g., in a similar manner as described herein in relation to FIG. 1B and reference number 104). As shown by reference number 114, the auto-discovery-RR may search the data structure to identify the one or more RR-clients and may send the RR advertisement route to at least one RR-client (e.g., at least one target RR-client) of the one or more RR-clients (e.g., in a similar manner as described herein in relation to FIG. 1B and reference number 106). In some implementations, the auto-discovery-RR may send the RR advertisement to each of the one or more RR-clients (e.g., RR-client 1 through RR-client M).

A target RR-client that receives the RR advertisement route may process the RR advertisement route to determine the information identifying the originating RR, the information identifying the address family associated with the originating RR, and/or additional information related to the originating RR (e.g., the information identifying the network associated with the originating RR; the information identifying the at least one configuration preference of the originating RR; the information identifying at least one route target associated with the originating RR; and/or the like). The target RR-client may update a data structure (e.g., included in the target RR-client) to include the information identifying the originating RR, the information identifying the address family associated with the originating RR, and/or at least some of the additional information related to the originating RR.

In some implementations, the target RR-client may determine whether the address family associated with the originating RR matches an address family associated with the RR-client (e.g., based on one or more configurations of the target RR-client that may be indicated by information included in the data structure of the target RR-client). When the target RR-client determines that the address family associated with the originating RR matches the address family associated with the RR-client, the target RR-client may update one or more settings of the RR-client. For example, as shown by reference number 116, the RR-client 1 may update one or more settings of the RR-client 1 (e.g., based on the RR advertisement route). In some implementations, updating the one or more settings of the target RR-client may allow the originating RR to be able to cause a connection with the target RR-client to be established. For example, the target RR-client may update at least one setting of the target RR-client (e.g., that may be stored in the data structure of the target RR-client) to indicate that the target RR-client may accept connection initiation requests from the originating RR.

Figure 1D:
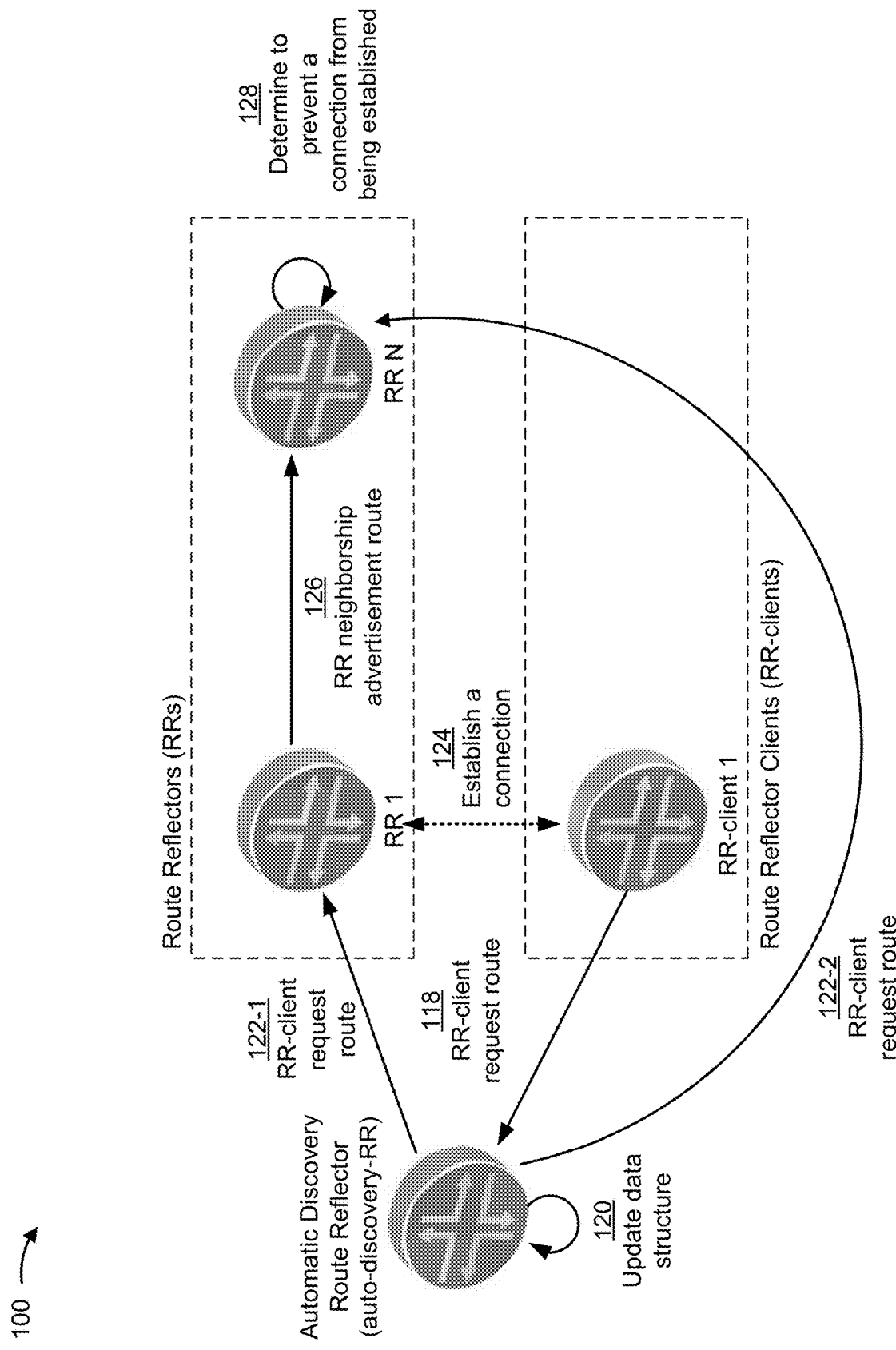

In some implementations, an RR-client, of the one or more RR-clients, may generate and/or send an auto-discovery signaling route, such as an RR-client request route to the auto-discovery-RR. For example, as shown in FIG. 1D and by reference number 118, an originating RR-client (e.g., RR-client 1) may generate and/or send an RR-client request route to the auto-discovery-RR. The originating RR-client may generate and/or send the RR-client request route to the auto-discovery-RR when the originating RR-client is added to the network, when the originating RR-client is updated (e.g., an address associated with the originating RR-client changes, an address family supported by the originating RR-client changes, a number of connections to the originating RR-client changes, and/or the like), and/or the like. The RR-client request route may include information identifying a route distinguisher of the route (e.g., a unique identifier); information identifying a type of the route (e.g., information indicating that the route is an RR-client request route); information identifying at least one address family associated with the originating RR-client (e.g., an AFI, an SAFI, and/or the like); information identifying the originating RR-client (e.g., an IP address associated with the originating RR-client, a physical location of the originating RR-client, and/or the like); information identifying a network associated with the originating RR-client (e.g., an AS associated with the originating RR-client); information identifying at least one configuration preference of the originating RR (e.g., a maximum number of connections supported by the originating RR-client; a preference for connecting to RRs that have a physical location within a threshold distance of a physical location of the originating RR-client; and/or the like); information identifying at least one route target associated with the originating RR (e.g., a route target indicating that the originating RR-client belongs to a particular group, such as a group comprising the one or more RR-clients, a group comprising just the originating RR-client, and/or the like); and/or the like.

As shown by reference number 120, the auto-discovery-RR, upon receiving the RR-client request route, may update the data structure included in the auto-discovery-RR to include at least some information contained in the RR-client request route. For example, the auto-discovery-RR may update the data structure to include the information identifying the originating RR-client, the information identifying the network associated with the originating RR-client, the information identifying the at least one configuration preference of the originating RR-client, the information identifying the at least one route target associated with the originating RR-client, and/or the like. In some implementations, the auto-discovery-RR may search the data structure to identify the one or more RRs and may send the RR-client request route to at least one RR (e.g., at least one target RR) of the one or more RRs. For example, as shown by reference numbers 122-1 and 122-2, the auto-discovery-RR may send the RR-client request route to the RR 1 and the RR N. In some implementations, the auto-discovery-RR may send the RR-client request route to each of the one or more RRs (e.g., RR 1 through RR N).

A target RR that receives the RR-client request route may process the RR-client request route to determine the information identifying the originating RR-client and/or additional information related to the originating RR-client (e.g., the information identifying the at least one address family associated with the originating RR-client; the information identifying the network associated with the originating RR-client; the information identifying the at least one configuration preference of the originating RR-client; the information identifying at least one route target associated with the originating RR-client; and/or the like). The target RR may update a data structure (e.g., included in the target RR) to include the information identifying the originating RR-client and/or at least some of the additional information related to the originating RR-client.

In some implementations, the target RR may cause a connection (e.g., a BGP session) to be established between the originating RR-client and the target RR. For example, as shown by reference number 124, the RR 1 may cause a connection between the RR-client 1 and the RR 1 to be established (e.g., based on the RR-client request route). The target RR may cause a connection to be established between the target RR and the originating RR-client by determining, based on the information identifying the originating RR-client, an address of the originating RR-client and sending, based on the address of the originating RR-client, a connection initiation request to the originating RR-client.

In some implementations, the target RR may determine whether to cause a connection to be established between the target RR and the originating RR-client based on the additional information related to the originating RR-client. For example, the target RR may determine, based on the additional information related to the originating RR-client, an address family associated with the originating RR-client and may determine, based on configuration information included in the data structure of the target RR, an address family associated with the target RR. When the target RR determines that the address family associated with the originating network device matches the address family associated with the target RR, the target RR may send a connection initiation request to the originating RR-client to cause the connection to be established between the target RR and the originating RR-client. Additionally, or alternatively, when the target RR determines that the address family associated with the originating network device does not match the address family associated with the target RR, the target RR may determine not to send a connection initiation request to the originating RR-client and may thereby prevent a connection from being established between the target RR and the originating RR-client.

In an additional example, the target RR may determine, based on the additional information related to the originating RR-client, a maximum number of connections of the originating RR-client, and may search the data structure of the target RR to determine a number of active connections to the originating RR-client. When the target RR determines that the number of active connections is less than the maximum number of connections, the target RR may send a connection initiation request to the originating RR-client to cause the connection to be established between the target RR and the originating RR-client. Additionally, or alternatively, when the target RR determines that the number of active connections is greater than or equal to the maximum number of connections, the target RR may determine not to send a connection initiation request to the originating RR-client and may thereby prevent a connection from being established between the target RR and the originating RR-client.

In a further example, the target RR may determine, based on the additional information related to the originating RR-client, a physical location of the originating RR-client and may determine, based on information stored in the data structure of the target RR, a physical location of the target RR. When the target RR determines that the physical location of the target RR is within (e.g., less than or equal to) a threshold distance (e.g., 1 kilometer (km), 10 km, 100 km, 1,000 km, and/or the like) of the physical location of the originating RR-client, the target RR may send a connection initiation request to the originating RR-client to cause the connection to be established between the target RR and the originating RR-client. Additionally, or alternatively, when the target RR determines that the physical location of the target RR is not within (e.g., greater than) the threshold distance of the physical location of the originating RR-client, the target RR may determine not to send a connection initiation request to the originating RR-client and may thereby prevent a connection from being established between the target RR and the originating RR-client.

In some implementations, upon receiving a connection initiation request sent by the target RR (e.g., as described in the examples above), the originating RR-client may determine (e.g., by searching the data structure included in the RR-client) a number of active connections that the originating RR-client has with at least some of the one or more RRs. The originating RR-client may determine whether the number of active connections satisfies (e.g., is greater than or equal to) a threshold (e.g., the maximum number of connections supported by the originating RR-client). When the originating RR-client determines that the number of active connections does not satisfy the threshold (e.g., the number of active sessions is less than the maximum number of connections supported by the originating RR-client), the originating RR-client may send a connection initiation request acceptance to the target RR to cause a connection to be established between the originating RR-client and the target RR. Accordingly, the originating RR-client may update the data structure included in the RR-client and/or the target RR may update the data structure included in the target RR to each indicate that an active connection exists between the originating RR-client and the target RR. Additionally, or alternatively, when the originating RR-client determines that the number of active connections satisfies the threshold (e.g., the number of active sessions is greater than or equal to the maximum number of connections supported by the originating RR-client), the originating RR-client may send a connection initiation request rejection to the target RR to prevent a connection from being established between the originating RR-client and the target RR.

In some implementations, after causing the connection to be established between the target RR and the originating RR-client, the target RR may generate and/or send an auto-discovery signaling route, such as an RR neighborship advertisement route to at least one different target RR of the one or more RRs. For example, as shown by reference number 126, the RR 1 may generate and/or send an RR neighborship advertisement route to the RR N (e.g., based on causing a connection between the RR 1 and the RR-client 1 to be established). In some implementations, the target RR may send the RR neighborship advertisement route to the auto-discovery-RR to cause the auto-discovery-RR to send the RR neighborship advertisement route to the at least one different target RR of the one or more RRs (e.g., in a similar manner as described herein in relation to FIG. 1B). Additionally, or alternatively, the target RR may directly send the RR neighborship advertisement route to the at least one different target RR of the one or more RRs (e.g., based on the respective connections between the target RR and the one or more RRs).

The RR neighborship advertisement route may include information that indicates that the target RR has caused a connection with the originating RR-client to be established. Additionally, or alternatively, the RR neighborship advertisement route may include information identifying a route distinguisher of the RR neighborship advertisement route (e.g., a unique identifier); information identifying a type of the RR neighborship advertisement route (e.g., information indicating that the route is an RR neighborship advertisement route); information identifying an address of the originating RR-client; information identifying an address family associated with the target RR (e.g., an AFI, a SAFI, and/or the like); information identifying the target RR (e.g., an IP address associated with the target RR, a physical location of the target RR, and/or the like); information identifying at least one configuration preference of the target RR (e.g., a maximum number of connections supported by the target RR); information identifying at least one route target associated with the target RR (e.g., information indicating that the target RR belongs to a particular group, such as a group comprising the one or more RRs, a group comprising just the target RR, and/or the like); information indicating a cost (e.g., an interior gateway protocol (IGP) cost to route from the target RR to the originating RR-client); and/or the like.

A different target RR that receives the RR neighborship advertisement route may process the RR neighborship advertisement route to determine the information that indicates that the target RR has caused a connection with the originating RR-client to be established and/or the additional information related to the target RR (e.g., the information identifying the address of the originating RR-client; information identifying the address family associated with the target RR; the information identifying the target RR; the information identifying at least one configuration preference of the target RR; the information identifying at least one route target associated with the target RR; the information indicating the cost to route from the target RR to the originating RR-client; and/or the like). The different target RR may update a data structure (e.g., included in the different target RR) to include the information that indicates that the target RR has caused a connection with the originating RR-client to be established and/or at least some of the additional information related to the target RR.

In some implementations, the different target RR may receive the RR-client request route after receiving and processing the RR neighborship advertisement route. For example, as shown in FIG. 1D, RR N may receive the RR-client request route sent by the auto-discovery-RR (e.g., described herein in relation to reference number 122-2) after receiving the RR neighborship advertisement route sent by RR 1 (e.g., described herein in relation to reference number 126). The different target RR may process the RR-client request route to determine whether to cause a connection to be established between the different target RR and the originating RR-client in a similar manner as described herein in relation to reference number 124.

For example, the different target RR may search the data structure of the different target RR (e.g., after updating the data structure based on receiving the RR neighborship advertisement route) to determine a number of active connections to the originating RR-client. When the different target RR determines that the number of active connections to the originating RR-client is less than the maximum number of connections to the RR-client (e.g., as indicated by the RR-client request route), the different target RR may send a connection initiation request to the originating RR-client to cause a connection to be established between the different target RR and the originating RR-client.

Additionally, or alternatively, when the different target RR determines that the number of active connections to the originating RR-client is greater than or equal to the maximum number of connections to the RR-client, the different target RR may determine not to send a connection initiation request to the originating RR-client and may thereby prevent a connection from being established between the different target RR and the originating RR-client. For example, as shown by reference number 128, the RR N may determine that the number of active connections to the RR-client 1 is greater than or equal to the maximum number of connections to the RR-client 1 and may determine to prevent a connection from being established between the RR N and the RR-client 1.

As indicated above, FIGS. 1A-1D are provided merely as one or more examples. Other examples may differ from what is described with regard to FIGS. 1A-1D.

FIGS. 2A-2C depict example routes described herein. As shown in FIG. 2A, example RR advertisement route 200 may include a prefix that includes a "Route-Distinguisher" field (e.g., a unique identifier for the route), a "Type" field (e.g., that indicates that the route is an RR advertisement route), a "Version" field (e.g., that indicates a version of the RR advertisement route), and/or an "AFI" field and an "SAFI" field (that indicates an address family of an originating RR sending the RR advertisement route). Further, the RR advertisement route may include (e.g., in a payload of the RR advertisement route) a "Nexthop" attribute or a "Multinexthop" attribute (e.g., that indicates an IP address of the originating RR), an "origin-AS" attribute (e.g., that indicates an AS associated with the originating RR), a "Local-pref" attribute (e.g., that indicates one or more configuration preferences of the originating RR), an "optional" attribute (e.g., that indicates a unique identifier associated with the originating RR), an "RTs" attribute (e.g., that indicates that the originating RR belongs to a particular group, such as a group of RRs), and/or the like.

As shown in FIG. 2B, example RR-client request route 210 may include a prefix that includes a "Route-Distinguisher" field (e.g., a unique identifier for the route), a "Type" field (e.g., that indicates that the route is an RR-client request route), a "Version" field (e.g., that indicates a version of the RR-client request route), and/or an "AFI" field and an "SAFI" field (that indicates an address family of an originating RR-client sending the RR-client request route). Further, the RR-client request route may include (e.g., in payload of the RR-client request route) a "Nexthop" attribute or a "Multinexthop" attribute (e.g., that indicates an IP address of the originating RR-client), an "origin-AS" attribute (e.g., that indicates an AS associated with the originating RR-client), a "Config attr" attribute (e.g., that indicates one or more configuration preferences of the originating RR-client), an "optional" attribute (e.g., that indicates a unique identifier associated with the originating RR-client), an "RTs" attribute (e.g., that indicates that the originating RR belongs to a particular group, such as a group of RR-clients), and/or the like.

As shown in FIG. 2C, example RR neighborhood advertisement route 220 may include a prefix that includes a "Route-Distinguisher" field (e.g., a unique identifier for the route), a "Type" field (e.g., that indicates that the route is an RR neighborhood advertisement route), a "Version" field (e.g., that indicates a version of the RR neighborhood advertisement route), a "ver" field (e.g., that indicates an IP version of an address of a RR-client connected to an originating RR sending the RR neighborhood advertisement route), a "Client-Address" field (e.g., that indicates the IP address of the RR-client), and/or an "AFI" field and an "SAFI" field (that indicates an address family of the originating RR). Further, the RR neighborhood advertisement route may include (e.g., in payload of the RR neighborhood advertisement route) a "Nexthop" attribute or a "Multi-nexthop" attribute (e.g., that indicates an IP address of the originating RR), a "MED" attribute (e.g., that indicates a cost to route from the originating RR to the RR-client), an "optional" attribute (e.g., that indicates a unique identifier associated with the originating RR), an "RTs" attribute (e.g., that indicates that the originating RR belongs to a particular group, such as a group of RRs, a group comprising just the originating RR, and/or the like), and/or the like.

As indicated above, FIGS. 2A-2C are provided merely as one or more examples. Other examples may differ from what is described with regard to FIGS. 2A-2C.

Figure 3:
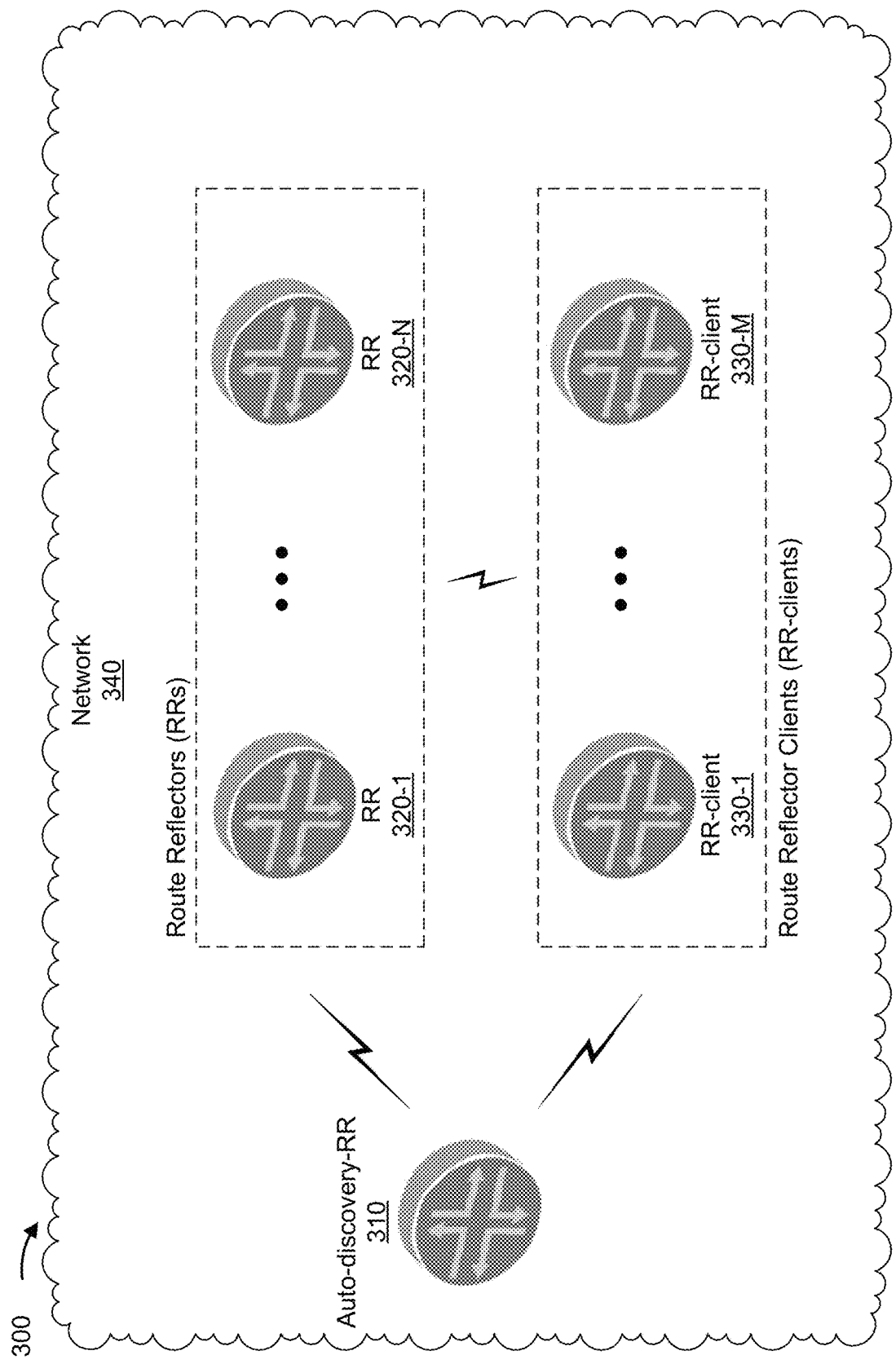
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include auto-discovery-RR 310, RR 320-1 through RR 320-N (hereinafter referred to collectively as "RRs 320," and individually as "RR 320"), RR-client 330-1 through RR-client 330-M (hereinafter referred to collectively as "RR-clients 330," and individually as "RR-client 330"), and a network 340. Devices of environment 300 may interconnect via wired connections, wireless connections, or a combination of wired and wireless connections.

Auto-discovery-RR 310 includes one or more devices (e.g., one or more traffic transfer devices) capable of processing and/or transferring traffic. For example, auto-discovery-RR 310 may include a firewall, a router, a gateway, a switch, a hub, a bridge, a reverse proxy, a server (e.g., a proxy server), a security device, an intrusion detection device, a load balancer, or a similar type of device. In some implementations, auto-discovery-RR 310 may be respectively connected to RR 320 and/or RR-client 330 via a link, a plurality of links, and/or the like. In some implementations, auto-discovery-RR 310 may transmit traffic to and/or receive traffic from RR 320 and/or RR-client 330, as described elsewhere herein. In some implementations, auto-discovery-RR 310 may be a physical device implemented within a housing, such as a chassis. In some implementations, auto-discovery-RR 310 may be a virtual device implemented by one or more computer devices of a cloud computing environment or a data center.

RR 320 includes one or more devices (e.g., one or more traffic transfer devices) capable of processing and/or transferring traffic. For example, RR 320 may include a firewall, a router, a gateway, a switch, a hub, a bridge, a reverse proxy, a server (e.g., a proxy server), a security device, an intrusion detection device, a load balancer, or a similar type of device. In some implementations, the RRs 320 may be fully meshed. In some implementations, one or more RRs 320 may serve as RRs for a cluster that includes the one or more RRs 320 and one or more RR-clients 330. In some implementations, RR 320 may transmit traffic to and/or receive traffic from auto-discovery-RR 310 and/or RR-client 330, as described elsewhere herein. In some implementations, RR 320 may be a physical device implemented within a housing, such as a chassis. In some implementations, RR 320 may be a virtual device implemented by one or more computer devices of a cloud computing environment or a data center.

RR-client 330 includes one or more devices (e.g., one or more traffic transfer devices) capable of processing and/or transferring traffic. For example, RR-client 330 may include a firewall, a router, a gateway, a switch, a hub, a bridge, a reverse proxy, a server (e.g., a proxy server), a security device, an intrusion detection device, a load balancer, or a similar type of device. In some implementations, one or more RR-clients 330 may be in a cluster that includes one or more RRs 320. In some implementations, RR-client 330 may transmit traffic to and/or receive traffic from auto-discovery-RR 310 and/or RR 320, as described elsewhere herein. In some implementations, RR-client 330 may be a physical device implemented within a housing, such as a chassis. In some implementations, RR-client 330 may be a virtual device implemented by one or more computer devices of a cloud computing environment or a data center.

Network 340 includes one or more wired and/or wireless networks. For example, network 340 may include a cellular network (e.g., a long-term evolution (LTE) network, a 3G network, a 4G network, a 5G network, a New Radio (NR) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), an Ethernet network, a VPN (E.g., a VPLS, an EVPN, a VPWS, an L2VPN, an L3VPN, and/or the like), a private network, an ad hoc network, an intranet, the Internet, a fiber optic-based network, a cloud computing network, or the like, and/or a combination of these or other types of networks. Network 340 may employ a routing protocol, such as BGP.

The number and arrangement of devices and networks shown in FIG. 3 are provided as one or more examples. In practice, there may be additional devices, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4A:
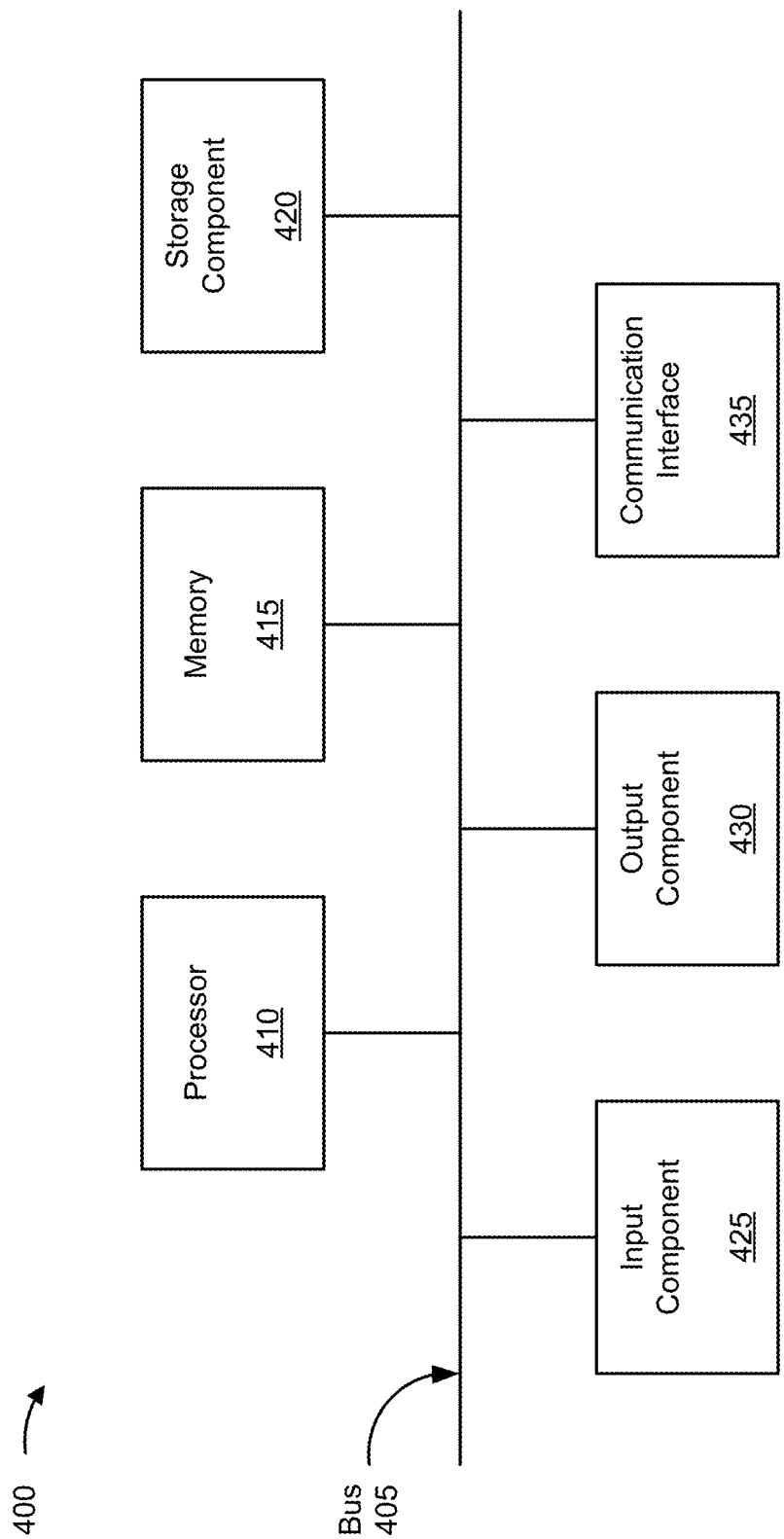
FIGS. 4A-4B are diagrams of example components of one or more devices of FIG. 3.
Figure 4B:
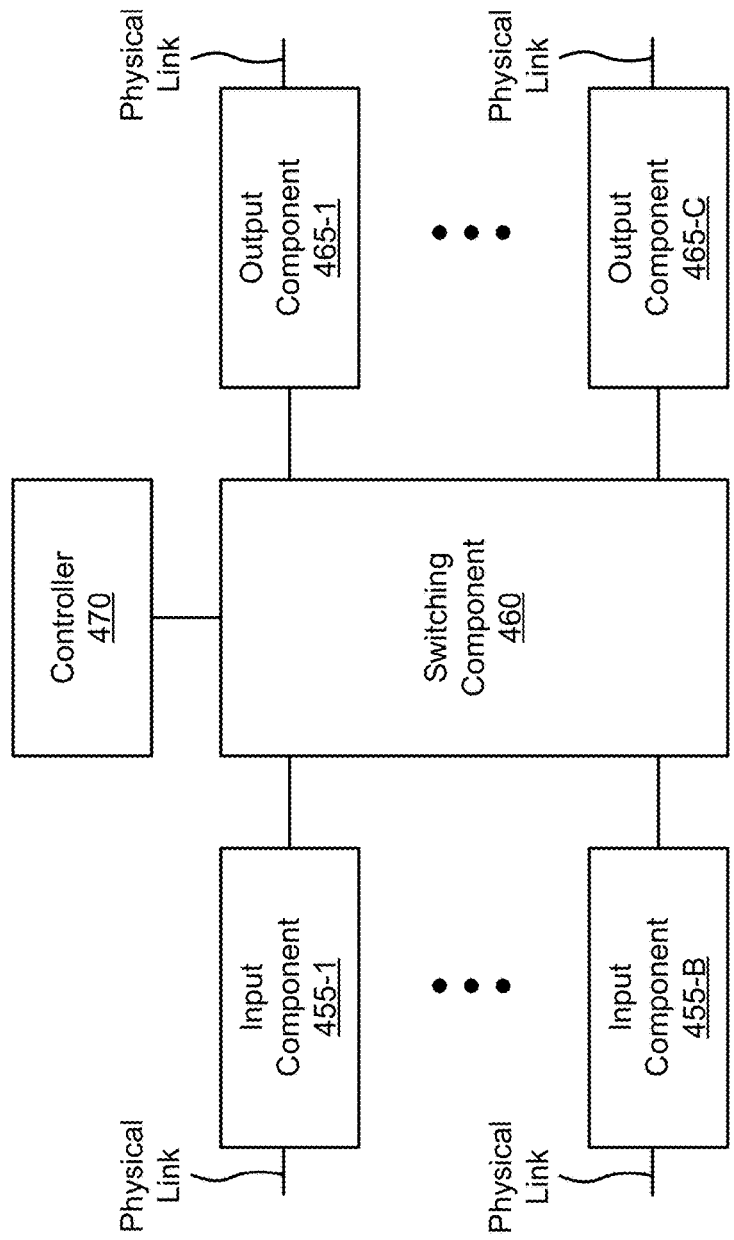

FIGS. 4A-4B are diagrams of example components of one or more devices of FIG. 3. FIG. 4A is a diagram of example components of a device 400. Device 400 may correspond to auto-discovery-RR 310, RR 320, RR-client 330, and/or the like. In some implementations, auto-discovery-RR 310, RR 320, RR-client 330, and/or the like may include one or more devices 400 and/or one or more components of device 400. As shown in FIG. 4A, device 400 may include a bus 405, a processor 410, a memory 415, a storage component 420, an input component 425, an output component 430, and a communication interface 435.

Bus 405 includes a component that permits communication among the components of device 400. Processor 410 is implemented in hardware, firmware, or a combination of hardware and software. Processor 410 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 410 includes one or more processors capable of being programmed to perform a function. Memory 415 includes a random access memory (RAM), a read only memory (ROM), and/or another type of dynamic or static storage device (e.g., a flash memory, a magnetic memory, and/or an optical memory) that stores information and/or instructions for use by processor 410.

Storage component 420 stores information and/or software related to the operation and use of device 400. For example, storage component 420 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 425 includes a component that permits device 400 to receive information, such as via user input (e.g., a touch screen display, a keyboard, a keypad, a mouse, a button, a switch, and/or a microphone). Additionally, or alternatively, input component 425 may include a sensor for sensing information (e.g., a global positioning system (GPS) component, an accelerometer, a gyroscope, and/or an actuator). Output component 430 includes a component that provides output information from device 400 (e.g., a display, a speaker, and/or one or more light-emitting diodes (LEDs)).

Communication interface 435 includes a transceiver-like component (e.g., a transceiver and/or a separate receiver and transmitter) that enables device 400 to communicate with other devices, such as via a wired connection, a wireless connection, or a combination of wired and wireless connections. Communication interface 435 may permit device 400 to receive information from another device and/or provide information to another device. For example, communication interface 435 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 410 executing software instructions stored by a non-transitory computer-readable medium, such as memory 415 and/or storage component 420. A computer-readable medium is defined herein as a non-transitory memory device. A memory device includes memory space within a single physical storage device or memory space spread across multiple physical storage devices.

Software instructions may be read into memory 415 and/or storage component 420 from another computer-readable medium or from another device via communication interface 435. When executed, software instructions stored in memory 415 and/or storage component 420 may cause processor 410 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4A are provided as an example. In practice, device 400 may include additional components, fewer components, different components, or differently arranged components than those shown in FIG. 4A. Additionally, or alternatively, a set of components (e.g., one or more components) of device 400 may perform one or more functions described as being performed by another set of components of device 400.

FIG. 4B is a diagram of example components of a device 450. Device 450 may correspond to auto-discovery-RR 310, RR 320, RR-client 330, and/or the like. In some implementations, auto-discovery-RR 310, RR 320, RR-client 330, and/or the like may include one or more devices 450 and/or one or more components of device 450. As shown in FIG. 4B, device 450 may include one or more input components 455-1 through 455-B (B≥1) (hereinafter referred to collectively as input components 455, and individually as input component 455), a switching component 460, one or more output components 465-1 through 465-C (C≥1) (hereinafter referred to collectively as output components 465, and individually as output component 465), and a controller 470.

Input components 455 may be points of attachment for physical links and may be points of entry for incoming traffic, such as packets. Input component 455 may process incoming traffic, such as by performing data link layer encapsulation or decapsulation. In some implementations, input component 455 may send and/or receive packets. In some implementations, input component 455 may include an input line card that includes one or more packet processing components (e.g., in the form of integrated circuits), such as one or more interface cards (IFCs), packet forwarding components, line card controller components, input ports, processors, memories, and/or input queues. In some implementations, device 450 may include one or more input components 455.

Switching component 460 may interconnect input components 455 with output components 465. In some implementations, switching component 460 may be implemented via one or more crossbars, via busses, and/or with shared memories. The shared memories may act as temporary buffers to store packets from input components 455 before the packets are eventually scheduled for delivery to output components 465. In some implementations, switching component 460 may enable input components 455, output components 465, and/or controller 470 to communicate.

Output component 465 may store packets and may schedule packets for transmission on output physical links. Output component 465 may support data link layer encapsulation or decapsulation, and/or a variety of higher-level protocols. In some implementations, output component 465 may send packets and/or receive packets. In some implementations, output component 465 may include an output line card that includes one or more packet processing components (e.g., in the form of integrated circuits), such as one or more IFCs, packet forwarding components, line card controller components, output ports, processors, memories, and/or output queues. In some implementations, device 450 may include one or more output components 465. In some implementations, input component 455 and output component 465 may be implemented by the same set of components (e.g., and input/output component may be a combination of input component 455 and output component 465).

Controller 470 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 470 may include one or more processors that can be programmed to perform a function.

In some implementations, controller 470 may include a RAM, a ROM, and/or another type of dynamic or static storage device (e.g., a flash memory, a magnetic memory, an optical memory, and/or the like) that stores information and/or instructions for use by controller 470.

In some implementations, controller 470 may communicate with other devices, networks, and/or systems connected to device 400 to exchange information regarding network topology. Controller 470 may create routing tables based on the network topology information, create forwarding tables based on the routing tables, and forward the forwarding tables to input components 455 and/or output components 465. Input components 455 and/or output components 465 may use the forwarding tables to perform route lookups for incoming and/or outgoing packets.

Controller 470 may perform one or more processes described herein. Controller 470 may perform these processes in response to executing software instructions stored by a non-transitory computer-readable medium.

Software instructions may be read into a memory and/or storage component associated with controller 470 from another computer-readable medium or from another device via a communication interface. When executed, software instructions stored in a memory and/or storage component associated with controller 470 may cause controller 470 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4B are provided as an example. In practice, device 450 may include additional components, fewer components, different components, or differently arranged components than those shown in FIG. 4B. Additionally, or alternatively, a set of components (e.g., one or more components) of device 450 may perform one or more functions described as being performed by another set of components of device 450.

FIG. 5 is a flow chart of an example process 500 for automatic discovery of route reflection peering end-points. In some implementations, one or more process blocks of FIG. 5 may be performed by a auto-discovery-RR (e.g., auto-discovery-RR 310). In some implementations, one or more process blocks of FIG. 5 may be performed by another device or a group of devices separate from or including the auto-discovery-RR, such as another auto-discovery-RR, and/or the like.

As shown in FIG. 5, process 500 may include obtaining a route from an originating network device (block 510). For example, the auto-discovery-RR (e.g., using processor 410, memory 415, storage component 420, input component 425, output component 430, communication interface 435, input component 455, switching component 460, output component 465, controller 470, and/or the like) may obtain a route from an originating network device, as described above.

As further shown in FIG. 5, process 500 may include updating a data structure to include at least some information contained in the route (block 520). For example, the auto-discovery-RR (e.g., using processor 410, memory 415, storage component 420, input component 425, output component 430, communication interface 435, input component 455, switching component 460, output component 465, controller 470, and/or the like) may update a data structure to include at least some information contained in the route, as described above.

As further shown in FIG. 5, process 500 may include identifying, based on the data structure, a plurality of target network devices, wherein the plurality of target network devices includes at least one RR and at least one RR-client (block 530). For example, the auto-discovery-RR (e.g., using processor 410, memory 415, storage component 420, input component 425, output component 430, communication interface 435, input component 455, switching component 460, output component 465, controller 470, and/or the like) may identify, based on the data structure, a plurality of target network devices, as described above. In some implementations, the plurality of target network devices includes at least one RR and at least one RR-client.

As further shown in FIG. 5, process 500 may include sending the route to the plurality of target network devices to facilitate establishment of a connection between the originating network device and at least one target network device of the plurality of target network devices (block 540). For example, the auto-discovery-RR (e.g., using processor 410, memory 415, storage component 420, input component 425, output component 430, communication interface 435, input component 455, switching component 460, output component 465, controller 470, and/or the like) may send the route to the plurality of target network devices to facilitate establishment of a connection between the originating network device and at least one target network device of the plurality of target network devices, as described above.

Process 500 may include additional implementations, such as any single implementation or any combination of implementations described below and/or in connection with one or more other processes described elsewhere herein.

In a first implementation, the auto-discovery-RR is respectively connected to the originating network device and each target network device of the plurality of target network devices.

In a second implementation, alone or in combination with the first implementation, the route includes at least one of information identifying a route distinguisher of the route; information identifying a type of the route; information identifying an address family associated with the originating network device; information identifying the originating network device; information identifying a network associated with the originating network device; information identifying at least one configuration preference of the originating network device; or information identifying at least one route target associated with the originating network device.

In a third implementation, alone or in combination with one or more of the first and second implementations, the originating network device and the at least one target network device are each RRs and the route is an RR advertisement route, wherein sending the route to the plurality of target network devices causes the at least one target network device to cause a connection with the originating network device to be established.

In a fourth implementation, alone or in combination with one or more of the first through third implementations, the originating network device and the at least one target network device are each RRs and the route is an RR advertisement route, wherein sending the route to the plurality of target network devices causes the at least one target network device to cause a connection with the originating network device to be established, and send, to the originating network device and via the connection, information concerning at least one address family supported by the at least one target network device.

In a fifth implementation, alone or in combination with one or more of the first through fourth implementations, the originating network device is an RR, the at least one target network device is an RR-client, and the route is an RR advertisement route, wherein sending the route to the plurality of target network devices causes the at least one target network device to update one or more settings of the at least one target network device to allow the originating network device to be able to cause a connection with the at least one target network device to be established.

In a sixth implementation, alone or in combination with one or more of the first through fifth implementations, the originating network device is an RR-client, the at least one target network device is an RR, and the route is an RR-client request route, wherein sending the route to the plurality of target network devices causes the at least one target network device to cause a connection with the originating network device to be established.

In a seventh implementation, alone or in combination with one or more of the first through sixth implementations, the originating network device is an RR-client, the at least one target network device is an RR, and the route is an RR-client request route, wherein sending the route to the plurality of target network devices causes the at least one target network device to cause a connection with the originating network device to be established, and send, based on causing the connection with the originating network device to be established, an RR neighborship advertisement route to at least one other target network device of the plurality of target network devices.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
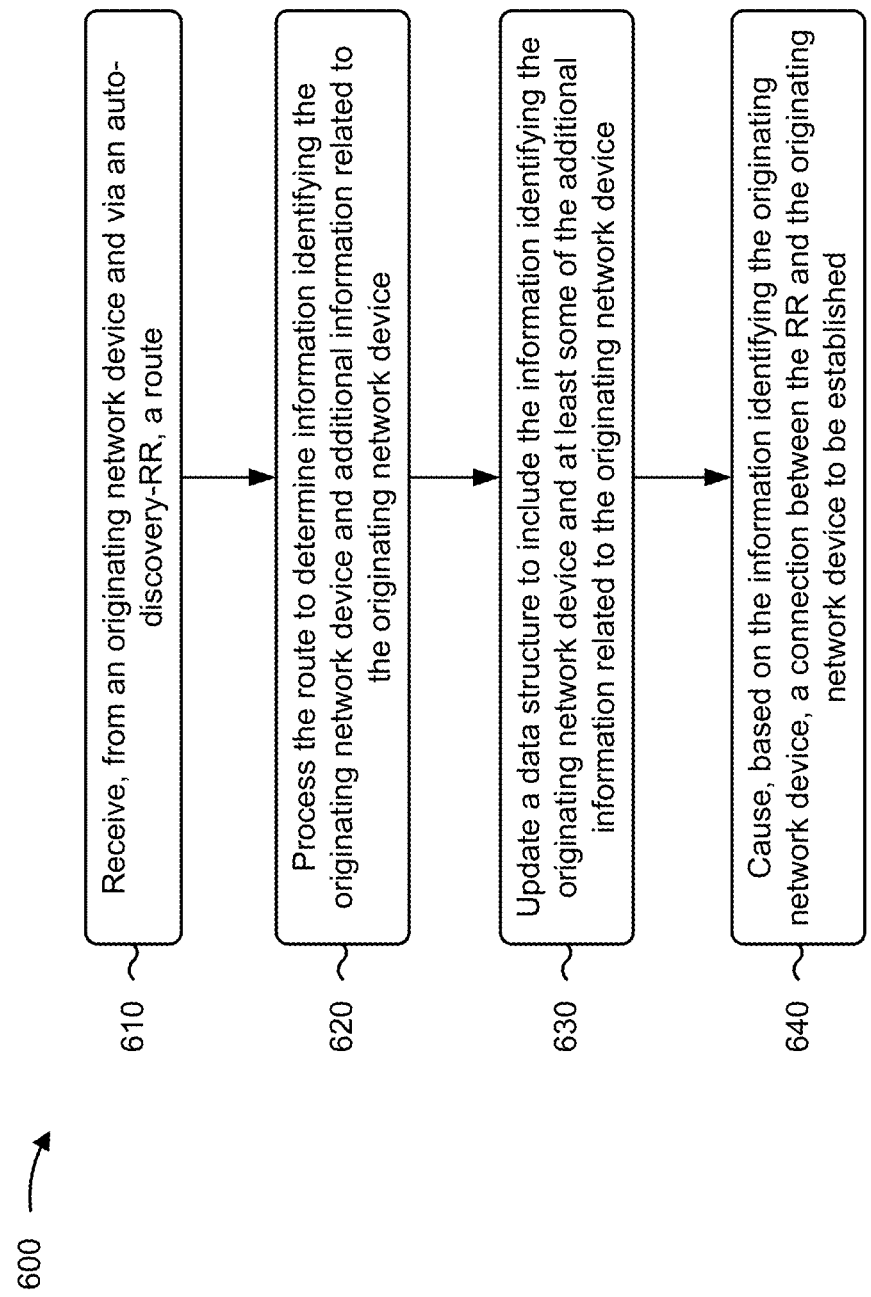

FIG. 6 is a flow chart of an example process 600 for automatic discovery of route reflection peering end-points. In some implementations, one or more process blocks of FIG. 6 may be performed by an RR (e.g., RR 320). In some implementations, one or more process blocks of FIG. 6 may be performed by another device or a group of devices separate from or including the RR, such as another RR.

As shown in FIG. 6, process 600 may include receiving, from an originating network device and via an auto-discovery-RR, a route (block 610). For example, the RR (e.g., using processor 410, memory 415, storage component 420, input component 425, output component 430, communication interface 435, input component 455, switching component 460, output component 465, controller 470, and/or the like) may receive, from an originating network device and via an auto-discovery-RR, a route, as described above.

As further shown in FIG. 6, process 600 may include processing the route to determine information identifying the originating network device and additional information related to the originating network device (block 620). For example, the RR (e.g., using processor 410, memory 415, storage component 420, input component 425, output component 430, communication interface 435, input component 455, switching component 460, output component 465, controller 470, and/or the like) may process the route to determine information identifying the originating network device and additional information related to the originating network device, as described above.

As further shown in FIG. 6, process 600 may include updating a data structure to include the information identifying the originating network device and at least some of the additional information related to the originating network device (block 630). For example, the RR (e.g., using processor 410, memory 415, storage component 420, input component 425, output component 430, communication interface 435, input component 455, switching component 460, output component 465, controller 470, and/or the like) may update a data structure to include the information identifying the originating network device and at least some of the additional information related to the originating network device, as described above.

As further shown in FIG. 6, process 600 may include causing, based on the information identifying the originating network device, a connection between the RR and the originating network device to be established (block 640). For example, the RR (e.g., using processor 410, memory 415, storage component 420, input component 425, output component 430, communication interface 435, input component 455, switching component 460, output component 465, controller 470, and/or the like) may cause, based on the information identifying the originating network device, a connection between the RR and the originating network device to be established, as described above.

Process 600 may include additional implementations, such as any single implementation or any combination of implementations described below and/or in connection with one or more other processes described elsewhere herein.

In a first implementation, the originating network device is an RR and the route is an RR advertisement route, and when causing the connection with the originating network device to be established, the RR may determine, based on the information identifying the originating network device, an address of the originating network device; send, based on the address of the originating network device, a connection initiation request to the originating network device to cause the connection to be established between the RR and the originating network device; and send, to the originating network device and via the connection, information concerning at least one address family supported by the RR.

In a second implementation, alone or in combination with the first implementation, the originating network device is an RR-client and the route is an RR-client request route, and when causing the connection with the originating network device to be established, the RR may determine, based on the additional information related to the originating network device, an address family associated with the originating network device; determine that the address family associated with the originating network device matches an address family supported by the RR; and send, based on determining that the address family associated with the originating network device matches the address family supported by the RR, a connection initiation request to the originating network device to cause the connection to be established between the RR and the originating network device.

In a third implementation, alone or in combination with one or more of the first and second implementations, the originating network device is an RR-client and the route is an RR-client request route, and when causing the connection with the originating network device to be established, the RR may determine, based on the additional information related to the originating network device, an address family associated with the originating network device and a maximum number of connections of the originating network device; determine that the address family associated with the originating network device matches an address family supported by the RR; determine, based on the data structure, that a number of active connections to the originating network device is less than the maximum number of connections to the originating network device; and cause, based on determining that that the address family associated with the originating network device matches the address family supported by the RR and determining that the number of active connections to the originating network device is less than the maximum number of connections to the originating network device, the connection between the RR and the originating network device to be established.

In a fourth implementation, alone or in combination with one or more of the first through third implementations, the originating network device is an RR-client and the route is an RR-client request route, and when causing the connection with the originating network device to be established, the RR may determine, based on the additional information related to the originating network device, an address family associated with the originating network device and a physical location of the originating network device; determine that the address family associated with the originating network device matches an address family supported by the RR; determine that a physical location of the RR is within a threshold distance of a physical location of the originating network device; and cause, based on determining that that the address family associated with the originating network device matches the address family supported by the RR and determining that the physical location of the RR is within the threshold distance of the physical location of the originating network device, the connection between the RR and the originating network device to be established.

In a fifth implementation, alone or in combination with one or more of the first through fourth implementations, the originating network device is an RR-client and the route is an RR-client request route, and the RR may further generate an RR neighborship advertisement route that indicates that the RR has caused a connection with the originating network device to be established; determine, based on the data structure, at least one other RR, and send the RR neighborship advertisement route to the at least one other RR.

In a sixth implementation, alone or in combination with one or more of the first through fifth implementations, the originating network device is an RR-client and the route is an RR-client request route, and when causing the connection with the originating network device to be established, the RR may determine, based on the additional information related to the originating network device, an address family associated with the originating network device and a maximum number of connections of the originating network device; determine that the address family associated with the originating network device matches an address family supported by the RR; receive, from another RR, an RR neighborship advertisement route that indicates that the other RR has caused a connection with the originating network device to be established; determine, based on the data structure and the RR neighborship advertisement route, that a number of active connections to the originating network device is less than the maximum number of connections to the originating network device; and cause, based on determining that that the address family associated with the originating network device matches the address family supported by the RR and determining that the number of active connections to the originating network device is less than the maximum number of connections to the originating network device, the connection between the RR and the originating network device to be established.

In a seventh implementation, alone or in combination with one or more of the first through sixth implementations, the RR neighborship advertisement route includes at least one of information identifying a route distinguisher of the RR neighborship advertisement route; information identifying a type of the RR neighborship advertisement route; information identifying an address of the originating network device; information identifying an address family associated with the other RR; information identifying the other RR; information identifying at least one configuration preference of the other RR; or information identifying at least one route target associated with the other RR.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for automatic discovery of route reflection peering end-points. In some implementations, one or more process blocks of FIG. 7 may be performed by an RR-client (e.g., RR-client 330). In some implementations, one or more process blocks of FIG. 7 may be performed by another device or a group of devices separate from or including the RR-client, such as another RR-client.

As shown in FIG. 7, process 700 may include receiving, from an originating RR and via an auto-discovery-RR, a route reflector advertisement route (block 710). For example, the RR-client (e.g., using processor 410, memory 415, storage component 420, input component 425, output component 430, communication interface 435, input component 455, switching component 460, output component 465, controller 470, and/or the like) may receive, from an originating RR and via an auto-discovery-RR, a route reflector advertisement route, as described above.

As further shown in FIG. 7, process 700 may include processing the RR advertisement route to determine information identifying the originating RR, information identifying an address family associated with the originating RR, and additional information related to the originating RR (block 720). For example, the RR-client (e.g., using processor 410, memory 415, storage component 420, input component 425, output component 430, communication interface 435, input component 455, switching component 460, output component 465, controller 470, and/or the like) may process the RR advertisement route to determine information identifying the originating RR, information identifying an address family associated with the originating RR, and additional information related to the originating RR, as described above.

As further shown in FIG. 7, process 700 may include updating a data structure to include the information identifying the originating RR, the information identifying the address family associated with the originating RR, and at least some of the additional information related to the originating RR (block 730). For example, the RR-client (e.g., using processor 410, memory 415, storage component 420, input component 425, output component 430, communication interface 435, input component 455, switching component 460, output component 465, controller 470, and/or the like) may update a data structure to include the information identifying the originating RR, the information identifying the address family associated with the originating RR, and at least some of the additional information related to the originating RR, as described above.

As further shown in FIG. 7, process 700 may include determining whether the address family associated with the originating RR matches an address family associated with the RR-client (block 740). For example, the RR-client (e.g., using processor 410, memory 415, storage component 420, input component 425, output component 430, communication interface 435, input component 455, switching component 460, output component 465, controller 470, and/or the like) may determine whether the address family associated with the originating RR matches an address family associated with the RR-client, as described above.

As further shown in FIG. 7, process 700 may include updating, based on determining that the address family associated with the originating RR matches the address family associated with the RR-client, one or more settings of the RR-client to allow the originating RR to be able to cause a connection with the RR-client to be established (block 750). For example, the RR-client (e.g., using processor 410, memory 415, storage component 420, input component 425, output component 430, communication interface 435, input component 455, switching component 460, output component 465, controller 470, and/or the like) may update, based on determining that the address family associated with the originating RR matches the address family associated with the RR-client, one or more settings of the RR-client to allow the originating RR to be able to cause a connection with the RR-client to be established, as described above.

Process 700 may include additional implementations, such as any single implementation or any combination of implementations described below and/or in connection with one or more other processes described elsewhere herein.

In a first implementation, the RR-client may further receive a connection initiation request from the originating RR; send a connection initiation request acceptance to the originating RR to cause a connection to be established between the originating RR and the RR-client; and update the data structure to indicate that an active connection exists between the originating RR and the RR-client.

In a second implementation, alone or in combination with the first implementation, the RR-client may further send an RR-client request route to a plurality of RRs, wherein the plurality of RRs includes the originating RR; receive, based on sending the RR-client request route, a connection initiation request from the originating RR; determine, after receiving the connection initiation request and based on the data structure, whether a number of active connections of the RR-client satisfies a threshold; send, based on determining that the number of active connections of the RR-client does not satisfy the threshold, a connection initiation request acceptance to the originating RR to cause a connection to be established between originating RR and the RR-client; and update the data structure to indicate that an active connection exists between the originating RR and the RR-client.

In a third implementation, alone or in combination with one or more of the first and second implementations, the RR-client may further send an RR-client request route to a plurality of RRs, wherein the plurality of RRs includes the originating RR and a different RR; receive, based on sending the RR-client request route, a first connection initiation request from the different RR; determine, after receiving the first connection initiation request and based on the data structure, that a number of active connections of the RR-client does not satisfy a threshold; send, based on determining that the number of active connections of the RR-client does not satisfy the threshold, a connection initiation request acceptance to the different RR to cause a connection to be established between the different RR and the RR-client; update the data structure to indicate that an active connection exists between the different RR and the RR-client; receive, based on sending the RR-client request route, a second connection initiation request from the originating RR; determine, after receiving the second connection initiation request and based on the data structure, that the number of active connections of the RR-client satisfies the threshold; and send, based on determining that the number of active connections of the RR-client satisfies the threshold, a connection initiation request rejection to the originating RR to prevent a connection from being established between the originating RR and the RR-client.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by an auto-discovery route reflector (auto-discovery-RR), a route from an originating network device;
    updating, by the auto-discovery-RR, a data structure to include at least some information contained in the route;
    identifying, by the auto-discovery-RR and based on the data structure, a plurality of target network devices,
        wherein the plurality of target network devices includes at least one route reflector (RR) and at least one route reflector client (RR-client), and
        wherein the RR and the RR-client are devices that are different from the auto-discovery-RR; and
    sending, by the auto-discovery-RR, the route to the plurality of target network devices to facilitate establishment of a connection between the originating network device and at least one target network device of the plurality of target network devices.

2. The method of claim 1, wherein the auto-discovery-RR is respectively connected to the originating network device and each target network device of the plurality of target network devices.

3. The method of claim 1, wherein the route includes at least one of:
    information identifying a route distinguisher of the route;
    information identifying a type of the route;
    information identifying an address family associated with the originating network device;
    information identifying the originating network device;
    information identifying a network associated with the originating network device;
    information identifying at least one configuration preference of the originating network device; or
    information identifying at least one route target associated with the originating network device.

4. The method of claim 1, wherein the originating network device and the at least one target network device are each RRs and the route is an RR advertisement route,
    wherein sending the route to the plurality of target network devices causes the at least one target network device to cause a connection with the originating network device to be established.

5. The method of claim 1, wherein the originating network device and the at least one target network device are each RRs and the route is an RR advertisement route,
    wherein sending the route to the plurality of target network devices causes the at least one target network device to:
        cause a connection with the originating network device to be established; and
        send, to the originating network device and via the connection, information concerning at least one address family supported by the at least one target network device.

6. The method of claim 1, wherein the originating network device is an RR, the at least one target network device is an RR-client, and the route is an RR advertisement route,
    wherein sending the route to the plurality of target network devices causes the at least one target network device to update one or more settings of the at least one target network device to allow the originating network device to be able to cause a connection with the at least one target network device to be established.

7. The method of claim 1, wherein the originating network device is an RR-client, the at least one target network device is an RR, and the route is an RR-client request route,
    wherein sending the route to the plurality of target network devices causes the at least one target network device to cause a connection with the originating network device to be established.

8. The method of claim 1, wherein the originating network device is an RR-client, the at least one target network device is an RR, and the route is an RR-client request route,
    wherein sending the route to the plurality of target network devices causes the at least one target network device to:
        cause a connection with the originating network device to be established; and
        send, based on causing the connection with the originating network device to be established, an RR neighborship advertisement route to at least one other target network device of the plurality of target network devices.

9. A route reflector (RR), comprising:
    one or more memories; and
    one or more processors to:
        receive, from an originating network device and via an auto-discovery route reflector (auto-discovery-RR), a route,
            wherein the auto-discovery-RR is different from the RR;
        process the route to determine information identifying the originating network device and additional information related to the originating network device;
        update a data structure to include the information identifying the originating network device and at least some of the additional information related to the originating network device; and
        cause, based on the information identifying the originating network device, a connection between the RR and the originating network device to be established.

10. The RR of claim 9, wherein the originating network device is an RR and the route is an RR advertisement route,
    wherein the one or more processors, when causing the connection with the originating network device to be established, are to:
        determine, based on the information identifying the originating network device,
        an address of the originating network device;
        send, based on the address of the originating network device, a connection initiation request to the originating network device to cause the connection to be established between the RR and the originating network device; and
        send, to the originating network device and via the connection, information concerning at least one address family supported by the RR.

11. The RR of claim 9, wherein the originating network device is a route reflector client (RR-client) and the route is an RR-client request route, wherein the one or more processors, when causing the connection with the originating network device to be established, are to:
determine, based on the additional information related to the originating network device, an address family associated with the originating network device;
determine that the address family associated with the originating network device matches an address family supported by the RR; and
send, based on determining that the address family associated with the originating network device matches the address family supported by the RR, a connection initiation request to the originating network device to cause the connection to be established between the RR and the originating network device.

12. The RR of claim 9, wherein the originating network device is a route reflector client (RR-client) and the route is an RR-client request route,
wherein the one or more processors, when causing the connection with the originating network device to be established, are to:
determine, based on the additional information related to the originating network device, an address family associated with the originating network device and a maximum number of connections of the originating network device;
determine that the address family associated with the originating network device matches an address family supported by the RR;
determine, based on the data structure, that a number of active connections to the originating network device is less than the maximum number of connections to the originating network device; and
cause, based on determining that that the address family associated with the originating network device matches the address family supported by the RR and determining that the number of active connections to the originating network device is less than the maximum number of connections to the originating network device, the connection between the RR and the originating network device to be established.

13. The RR of claim 9, wherein the originating network device is a route reflector client (RR-client) and the route is an RR-client request route,
wherein the one or more processors, when causing the connection with the originating network device to be established, are to:
determine, based on the additional information related to the originating network device, an address family associated with the originating network device and a physical location of the originating network device;
determine that the address family associated with the originating network device matches an address family supported by the RR;
determine that a physical location of the RR is within a threshold distance of a physical location of the originating network device; and
cause, based on determining that that the address family associated with the originating network device matches the address family supported by the RR and determining that the physical location of the RR is within the threshold distance of the physical location of the originating network device, the connection between the RR and the originating network device to be established.

14. The RR of claim 9, wherein the originating network device is a route reflector client (RR-client) and the route is an RR-client request route,
wherein the one or more processors are further to:
generate an RR neighborship advertisement route that indicates that the RR has caused a connection with the originating network device to be established;
determine, based on the data structure, at least one other RR; and
send the RR neighborship advertisement route to the at least one other RR.

15. The RR of claim 9, wherein the originating network device is a route reflector client (RR-client) and the route is an RR-client request route,
wherein the one or more processors, when causing the connection with the originating network device to be established, are to:
determine, based on the additional information related to the originating network device, an address family associated with the originating network device and a maximum number of connections of the originating network device;
determine that the address family associated with the originating network device matches an address family supported by the RR;
receive, from another RR, an RR neighborship advertisement route that indicates that the other RR has caused a connection with the originating network device to be established;
determine, based on the data structure and the RR neighborship advertisement route, that a number of active connections to the originating network device is less than the maximum number of connections to the originating network device; and
cause, based on determining that that the address family associated with the originating network device matches the address family supported by the RR and determining that the number of active connections to the originating network device is less than the maximum number of connections to the originating network device, the connection between the RR and the originating network device to be established.

16. The RR of claim 15, wherein the RR neighborship advertisement route includes at least one of:
information identifying a route distinguisher of the RR neighborship advertisement route;
information identifying a type of the RR neighborship advertisement route;
information identifying an address of the originating network device;
information identifying an address family associated with the other RR;
information identifying the other RR;
information identifying at least one configuration preference of the other RR; or
information identifying at least one route target associated with the other RR.

17. A non-transitory computer-readable medium storing instructions, the instructions comprising:
one or more instructions that, when executed by one or more processors of a route reflector client (RR-client), cause the one or more processors to:
receive, from an originating route reflector (RR) and via an auto-discovery route reflector (auto-discovery-RR), a route reflector advertisement route,
wherein the auto-discovery-RR is different from the RR;

process the RR advertisement route to determine information identifying the originating RR, information identifying an address family associated with the originating RR, and additional information related to the originating RR;

update a data structure to include the information identifying the originating RR, the information identifying the address family associated with the originating RR, and at least some of the additional information related to the originating RR;

determine whether the address family associated with the originating RR matches an address family associated with the RR-client; and update, based on determining that the address family associated with the originating RR matches the address family associated with the RR-client, one or more settings of the RR-client to allow the originating RR to be able to cause a connection with the RR-client to be established.

18. The non-transitory computer-readable medium of claim 17, wherein the one or more instructions, when executed by the one or more processors, further cause the one or more processors to:

receive a connection initiation request from the originating RR;

send a connection initiation request acceptance to the originating RR to cause a connection to be established between the originating RR and the RR-client; and update the data structure to indicate that an active connection exists between the originating RR and the RR-client.

19. The non-transitory computer-readable medium of claim 17, wherein the one or more instructions, when executed by the one or more processors, further cause the one or more processors to:

send an RR-client request route to a plurality of RRs, wherein the plurality of RRs includes the originating RR;

receive, based on sending the RR-client request route, a connection initiation request from the originating RR;

determine, after receiving the connection initiation request and based on the data structure, whether a number of active connections of the RR-client satisfies a threshold;

send, based on determining that the number of active connections of the RR-client does not satisfy the threshold, a connection initiation request acceptance to the originating RR to cause a connection to be established between originating RR and the RR-client; and update the data structure to indicate that an active connection exists between the originating RR and the RR-client.

20. The non-transitory computer-readable medium of claim 17, wherein the one or more instructions, when executed by the one or more processors, further cause the one or more processors to:

send an RR-client request route to a plurality of RRs, wherein the plurality of RRs includes the originating RR and a different RR;

receive, based on sending the RR-client request route, a first connection initiation request from the different RR;

determine, after receiving the first connection initiation request and based on the data structure, that a number of active connections of the RR-client does not satisfy a threshold;

send, based on determining that the number of active connections of the RR-client does not satisfy the threshold, a connection initiation request acceptance to the different RR to cause a connection to be established between the different RR and the RR-client;

update the data structure to indicate that an active connection exists between the different RR and the RR-client;

receive, based on sending the RR-client request route, a second connection initiation request from the originating RR;

determine, after receiving the second connection initiation request and based on the data structure, that the number of active connections of the RR-client satisfies the threshold; and send, based on determining that the number of active connections of the RR-client satisfies the threshold, a connection initiation request rejection to the originating RR to prevent a connection from being established between the originating RR and the RR-client.

* * * * *